INVENTORS
C. D. CURTIS
D. C. BICHEL

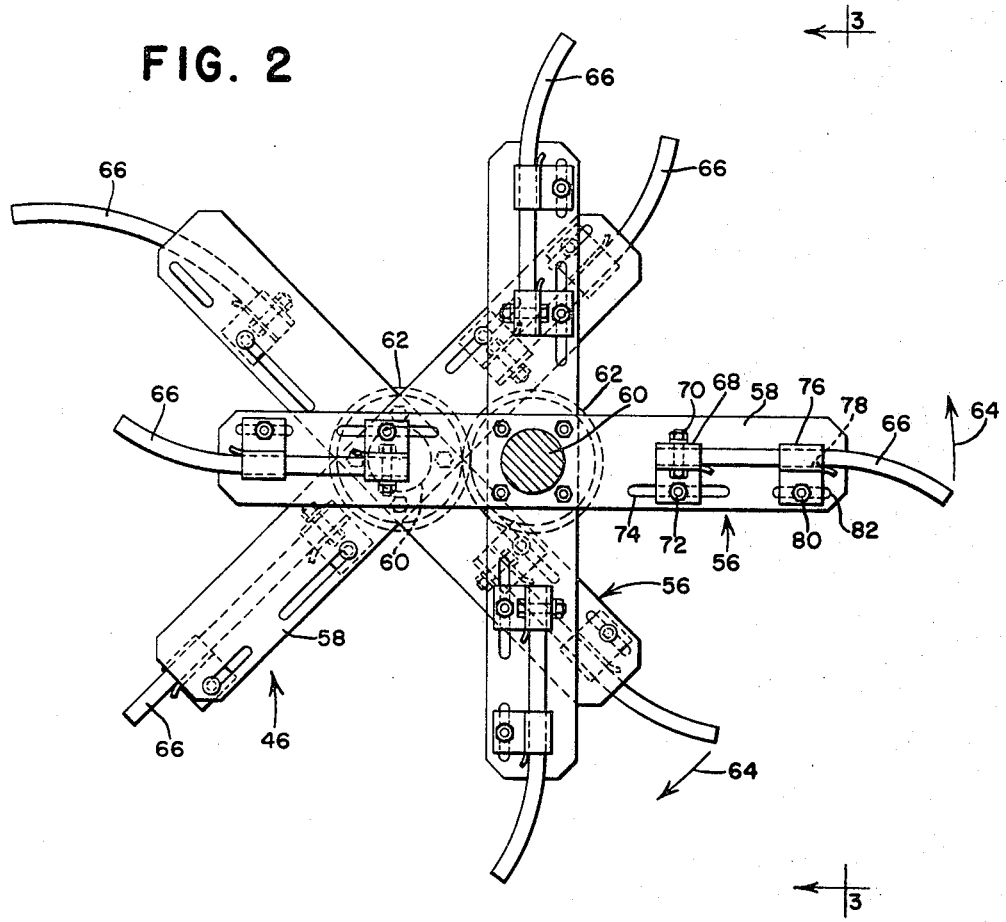
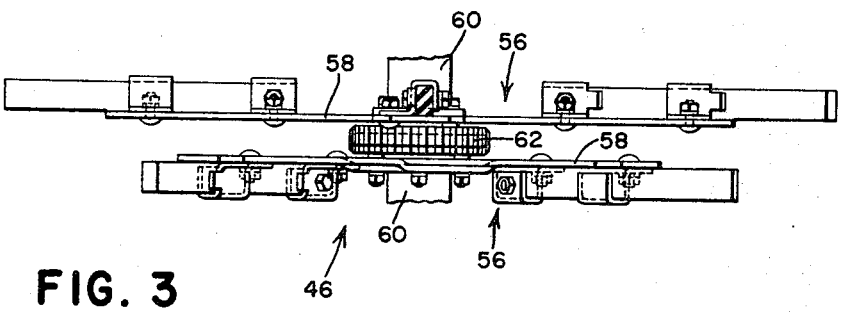

United States Patent Office 3,410,064
Patented Nov. 12, 1968

3,410,064
ROTARY PLANT KNOCKER FOR A
SEED HARVESTER
Charles D. Curtis, Silvis, and Darwin C. Bichel, East Moline, Ill., assignors to Deere & Company, Moline, Ill., a corporation of Delaware
Filed Oct. 22, 1965, Ser. No. 502,227
8 Claims. (Cl. 56—19)

ABSTRACT OF THE DISCLOSURE

A self-propelled combine has a castor bean harvesting header which includes a pair of fore-and-aft passages through which the lower part of the castor bean plant passes as the combine advances. Adjacent each passage is a horizontal rotary knocker having four radially extending rubber flails which strike the base of the plants moving along the passage to shake the plant and thereby dislodge the ripe castor beans attached to the plant.

This invention relates to a device on a seed harvester for dislodging seeds from their plants and more particularly to an improved rotary plant knocker for a castor bean harvester or the like.

Castor beans are raised commercially for the oil contained in their seeks or beans which grow inside capsules or pods attached to the plants. The plants are normally planted in rows and attain a relatively large size, some varieties reaching a height of six feet or more. As described in U.S. Patent 3,030,756, assigned to the assignee herein, harvesting of castor beans is best accomplished by shaking the mature capsules from the plants, collecting the capsules, and then separating the seeds or beans from their capsules. The capsules are dislodged from the plants by means of a knocking device which strikes the plant stalks close to the ground without destroying the plants, the resulting vibration of the plant dislodging the mature capsules. The knocking device described in said patent includes a disk-like rotating member pivotally carrying a plurality of inflexible knocker arms, which are extended into a stalk striking position by centrifugal force during rotation of the device, the knocker arms swinging away to a stalk-clearing position upon striking the plant stalk.

However, different varieties of castor bean plants are used and the plants also vary widely according to their location and the time of harvest. Accordingly, the optimum knocking force also varies. However, the knocking force delivered by previous knocking devices could not be varied since the centrifugal force acting on the knocker arms remained relatively constant.

The present invention is an improvement in such knocking devices and utilizes resilient and flexible knocker arms or elements to strike the plant stalks.

Another object of the invention is to provide means for adjusting the flexibility of the knocker arms to vary the knocking impact, and further to provide means for adjusting the radial length of the knocker arms.

Still another object is to provide such a knocker device which is simple and economical to manufacture and maintain and which utilizes knocker arms which can be made of used tire carcasses to provide knocker arms which are both durable and inexpensive to install or replace.

These and other objects will become apparent from the following detailed description and accompanying drawings wherein:

FIG. 2 is an enlarged plan view of the knocking device, two knocker arms on one of the rotary knockers being sown in different stages of adjustment from the remaining knocker arms.

FIG. 3 is a section as viewed along the line 3—3 of FIG. 2.

Figure 1:
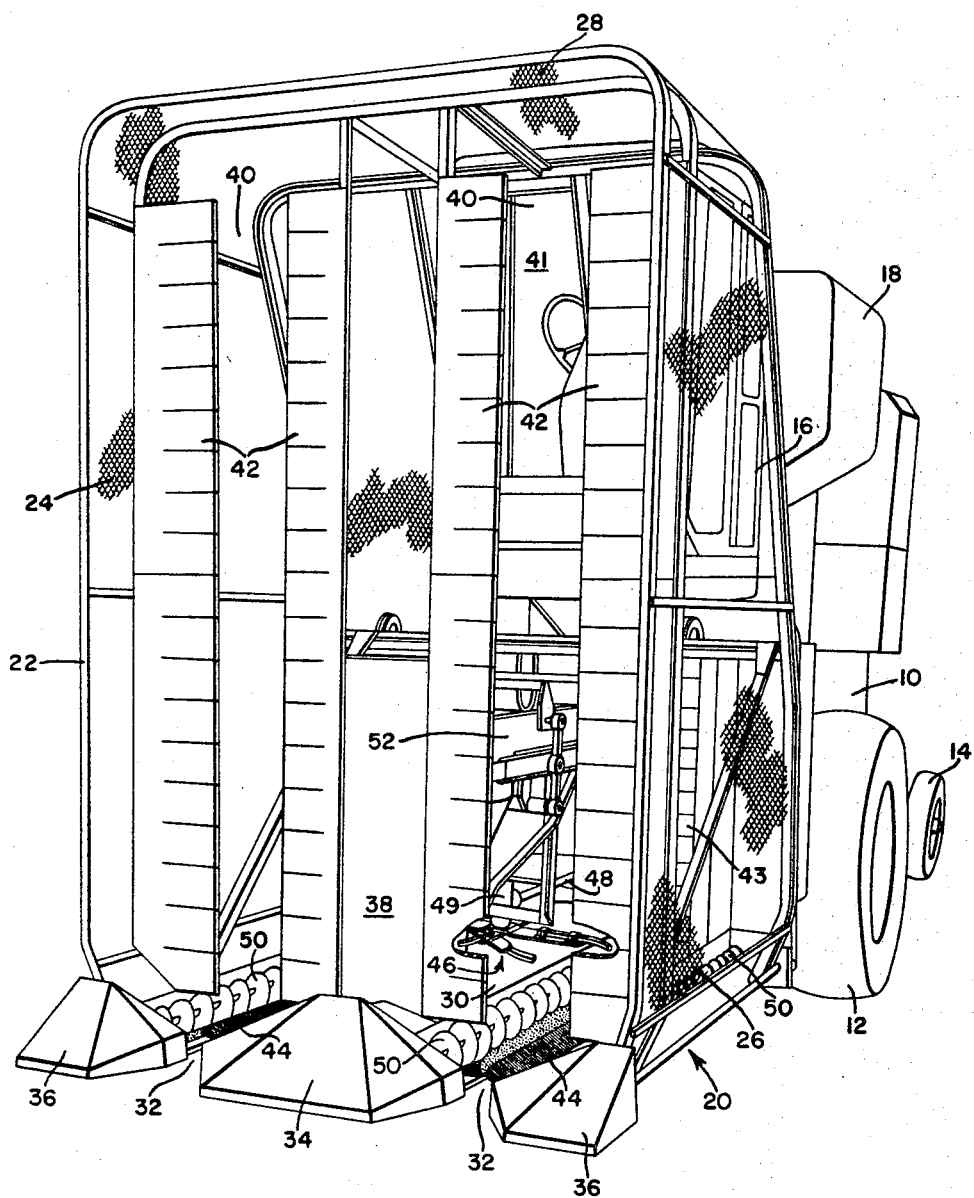
FIG. 1 is a front perspective of a two-row caster bean harvester with a forward portion of the harvester broken away to show the improved knocking device.

The knocking device will be described on a castor bean harvester attachment for a conventional agricultural combine, described in the assignee's previously mentioned U.S. Patent 3,030,756, although it is to be understood that the present invention could also be used in other types of castor bean harvesters or similar seed harvesters.

A typical self-propelled combine is shown in FIG. 1 and includes a main separator body 10, mounted on front drive wheels 12 and steerable rear wheels 14, a forwardly disposed operator's station 16, and a grain tank 18 mounted above the combine body 10 and rearwardly of the operator's station 16.

A castor bean harvesting unit or header, indicated generally by the numeral 20, extends forwardly from the combine body 10 in the same manner as a conventional grain header or corn header. The castor bean header 20 includes a box-like cage structure 22 having wire mesh side panels 24 and 26 and a wire mesh top panel 28. The cage structure 22 also has a bottom 30, which is normally supported relatively close to the ground, the bottom 30 having a pair of fore-and-aft plant-receiving passageways 32, which respectively received adjacent rows of plants as the machine advances. The forward edge of the bottom 30 includes a middle crop divider 34 between the passages 32 and a pair of outer crop dividers 36, the crop dividers 34 and 36 guiding the plants into the passageways 32. The cage structure also includes a front panel 38 having a pair of vertical openings 40 respectively above the passages 32. As is apparent from the drawings, the vertical openings 40 in the cage structure 22 are relatively tall to accommodate relatively tall plants. It can be appreciated that a much shorter cage structure could be utilized in harvesting shorter varieties of castor beans. A rear panel 41, having vertical openings (not shown) aligned with the front vertical openings 40, completes the cage structure 22. The cage structure 22 is thus completely enclosed except for the front openings 40, which permit the entrance of the plants, the rear openings, which permit the egress of the plants, and the passages 32, which permit the movement of the plants through the cage structure, thereby preventing the loss of castor beans while the plants are within the cage structure. Each side of each vertical front opening 40 is lined with resilient flaps 42 and the rear vertical openings are lined with rear flaps 44 to reduce the loss of beans through said openings. Each passageway 32 has its lateral edges lined with flexible brushes 43, which extend the length of the passageway and cooperate to close the passageway except for the plant stalks, thereby preventing the loss of beans through the bottom 30.

In operation, as the plants enter the vertical openings 40 and the plant stalks move rearwardly along the passageways 32, each plant stalk is struck by a knocking device, indicated generally by the numeral 46, which vibrates the plants sufficiently to dislodge the mature castor bean capsules, while avoiding destruction of the plant. The knocking device 46 is of the rotary type, connected to and driven by the combine attachment drive via a fore-and-aft drive shaft 48 and a gear box 49. The castor bean capsules fall onto the bottom 30 and the brushes 43, from which they are collected and moved rearwardly by fore-and-aft auger-type conveyors 50 mounted on opposite sides of each passageway 32. The auger-type conveyors 50 move the capsules to additional conveyor means, which move the capsules to separator or scalper means 52, which, in turn, separate the capsules from trash such as sticks and leaves. The separated capsules are then moved rearwardly through a conventional forwardly disposed combine inlet for delivery to the combine threshing mechanism within the body 10 for separating the castor beans or seeds from their capsules.

The knocking device 46 is mounted in the cage structure 22, closely above the bottom 30 and between the passageways 32, and includes a pair of rotary knockers, indicated generally by the numeral 56, mounted in a laterally adjacent overlapping relationship, each rotary knocker 56 operating on the plant stalks in one passage 32. Each rotary knocker 56 includes a symmetrical X-shaped rotary member 58 having an upright axial shaft 60. The shafts 60 carry coaxial spur gears 62, which mesh to rotate the two rotary knockers 56 in opposite directions, as indicated by the arrows 64 in FIG. 2, one of said axial shafts being connected to the gear box 49.

An elongated, flexible, and resilient knocker arm or element 66, preferably made of reinforced rubber or the like, is mounted on and extends radially from each extending portion of the rotary members 58. Each knocker arm 66 is attached to its rotary member by a clamping device 68, which is attached to one end of each knocker arm by a fastener 70 and is attached to the rotary member 58 by a fastener 72. When the fastener 72 is in a loosened condition, it is radially slidable in a radial slot 74 in the rotary member, so that the radial position of the clamping device 68, and the knocker arm 66 attached thereto, is adjustable. The knocker arm 66 is secured in the desired position by tightening the fastener 72. Each knocker arm 66 is also supported intermediate its ends by a fulcrum means 76 having a radial slot 78, which slidably accommodates the knocker arm 66, each fulcrum means being mounted for radial adjustment on the rotary member 58 by means of a fastener 80 extending through a radial slot in the rotary member, whereby the fulcrum means 76 may be radially moved when the fastener 80 is in a loosened condition.

As shown in FIG. 1, the outer or extended portion of each knocker arm 66 moves above a passageway 32 during rotation of the knocking device 46, whereby the extended portion strikes the stalks of plants moving along the passageway 32. Upon striking a plant stalk, the flexible knocker arm 66 deflects in the opposite direction from the direction of rotation about the fulcrum means 76, until the extended portion of the knocker arm 66 clears the plants' stalk, whereupon the resilient knocker arm will return to its normal, substantially radial position.

Since the knocker arms 66 are flexible, they will deflect slightly in the opposite direction from the direction of rotation due to wind resistance during rotation. Moreover, used tire carcasses furnish a convenient source of reinforced rubber, which is the preferable material for the knocker arms 66, and such tire carcasses will naturally provide a slight bow in the knocker arm, the knocker arms being oriented so that they are convex in the direction of rotation.

As previously described, the radial extension of the knocker arms is variable by sliding the clamping device 68 in a radial direction on the rotary member 58, thereby varying the knocker arm flexibility. The flexibility of the knocker arms is also variable by radially adjusting the fulcrum means 76 about which the knocker arms deflect, the greater the radial extension of the knocker arms from the fulcrum means, the greater the knocker arm flexibility. Thus, for any given extension of a knocker arm 66, as established by the clamping device 68, the flexibility of the knocker arm can be increased by moving the fulcrum means 76 radially inward and the flexibility can be decreased by moving the fulcrum means 76 radially outward. To further decrease flexibility, the radial extension of the knocker arm can be decreased by moving the clamping device 68 radially inward, thereby decreasing the distance between the end of the knocker arm and the fulcrum means 76.

The lower left knocker arm 66 in FIG. 2 is shown in its most rigid position, the fulcrum means 76 being placed in its extreme outer position and the clamping device 68 being placed in its extreme inward position. The flexibility can be increased by moving the clamping device 68 radially outward and/or moving the fulcrum means 76 radially inward to increase the distance between the end of the knocker arm and the fulcrum means. If still greater flexibility is desired, the fulcrum means can be removed by simply removing the fastener 80 so that the knocker arm 66 is supported only at its end by the clamping device 68, the upper left knocker arm 66 in FIG. 2 being shown in this condition. Thus, it is apparent that radial adjustment of the clamping device 68 and the fulcrum means 76 will provide a large range of knocker arm flexibility to accommodate different crop conditions, as well as providing flexibility for the length of the knocker arm to adjust for wear on the knocker arm.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a harvester having a mobile frame adapted to advance over a field of row-planted crops and having a harvesting means including at least one fore-and-aft passageway relatively close to the ground adapted to receive a row of plants as the machine advances, the combination therewith of knocker means for striking the plants relatively closely above each passageway comprising: at least one rotary member mounted on the harvesting means for rotation about an approximately upright axis laterally adjacent to each passageway; at least one flexible and resilient knocker arm of rubber-like material mounted on each rotary member with its inner end rigidly connected thereto for rotation therewith, normally extending in a generally radial direction from the rotary member to strike plants in said adjacent passageway during said rotation, and being deflectable upon engaging a plant to permit movement of said plant along the passageway.

2. The invention defined in claim 1 in which each knocker arm is mounted on the rotary member for selective radial adjustment to vary the radial extension of the knocker arm from the rotary member.

3. The invention defined in claim 1 and including a fulcrum means mounted on the rotary member and operably engaging the rearward side of each knocker arm with respect to the direction of rotation to support a portion of the knocker arm intermediate its ends against deflection upon engaging a plant.

4. The invention defined in claim 3 wherein the fulcrum means is radially adjustable on the rotary member to vary the unsupported length of each knocker arm.

5. The invention defined in claim 4 wherein each knocker arm is mounted on the rotary member for selective radial adjustment to vary the radial extension of the knocker arm from the rotary member.

6. The invention defined in claim 5 wherein the fulcrum means is removably mounted on the rotary member.

7. In a castor bean harvester or the like having a mobile body adapted to advance over a field of row-planted castor bean plants or the like and having harvesting means including fore-and-aft plant-receiving passage means relatively close to the ground, the combination therewith of knocker means closely above the passage means for striking the plants to dislodge seeds from said plants and comprising: a plurality of rotary members mounted for rotation about approximately upright axes adjacent the passage means; a plurality of elongated resilient knocker arms mounted on and extending in a generally radial direction from each rotary member for rotation therewith, the extended portion of each knocker arm moving closely above said passage means to strike said plants during its rotation and deflecting to a plant-clearing position after engaging a plant; and fulcrum means mounted on each rotary member and operably engaging each knocker arm intermediate its end to support a portion of each knocker arm from deflecting when the knocker arm strikes a plant.

8. The invention defined in claim 7 wherein the fulcrum means is removably mounted and radially adjustable on each rotary member to vary the unsupported and deflectable portion of each knocker arm.

References Cited

UNITED STATES PATENTS

| | | | |
|---|---|---|---|
| 328,670 | 10/1885 | Hall | 56—400 |
| 964,384 | 7/1910 | Brigden | 172—708 |
| 1,937,775 | 12/1933 | Neuhausen | 56—400 X |
| 2,952,962 | 9/1960 | Suverkrop | 56—130 |
| 3,030,756 | 4/1962 | Morrison et al. | 56—19 |
| 3,073,098 | 1/1963 | Farrar et al. | 56—19 |

ROBERT E. BAGWILL, *Primary Examiner.*